(12) United States Patent
Gariglio

(10) Patent No.: US 11,768,475 B2
(45) Date of Patent: Sep. 26, 2023

(54) MACHINE FOR WORKING GLASS SLABS WITH A COMPUTERIZED NUMERIC CONTROL ASSEMBLY AND RELATED PRODUCTION PROCESS

(71) Applicant: FORVET S.P.A. COSTRUZIONE MACCHINE SPECIALI, Volvera (IT)

(72) Inventor: Davide Gariglio, Volpiano (IT)

(73) Assignee: FORVET S.P.A. COSTRUZIONE MACCHINE SPECIALI, Volvera (IT)

(*) Notice: Subject to any disclaimer, the term of this patent is extended or adjusted under 35 U.S.C. 154(b) by 1306 days.

(21) Appl. No.: 16/083,797

(22) PCT Filed: Mar. 6, 2017

(86) PCT No.: PCT/IT2017/000045
§ 371 (c)(1),
(2) Date: Sep. 10, 2018

(87) PCT Pub. No.: WO2017/154032
PCT Pub. Date: Sep. 14, 2017

(65) Prior Publication Data
US 2019/0086896 A1  Mar. 21, 2019

(30) Foreign Application Priority Data

Mar. 11, 2016 (IT) .. UA20161572102016000025832
Mar. 11, 2016 (IT) .. UA20161575102016000025849

(51) Int. Cl.
*G05B 19/402* (2006.01)
*G05B 19/18* (2006.01)
(Continued)

(52) U.S. Cl.
CPC ............ *G05B 19/182* (2013.01); *B23B 41/00* (2013.01); *B24B 9/102* (2013.01);
(Continued)

(58) Field of Classification Search
CPC ............... G05B 19/182; G05B 19/402; G05B 2219/35525; G05B 2219/36439;
(Continued)

(56) References Cited

U.S. PATENT DOCUMENTS 3,574,976 A * 4/1971 McMaster ............ D04B 15/365
451/41
3,834,258 A * 9/1974 Zumstein ........... B23D 36/0091
83/76.3

(Continued)

FOREIGN PATENT DOCUMENTS

EP   1166961 A1   1/2002
EP   2687327 A1   1/2014

*Primary Examiner* — Rina I Duda
(74) *Attorney, Agent, or Firm* — Heslin Rothenberg Farley & Mesiti P.C.; Victor A. Cardona, Esq.

(57) ABSTRACT

A machine for working glass slabs includes a supporting structure, a slab grinding section having grinding heads, a conveyor assembly adapted to move the glass slab, and a slab drilling section having a conveyor adjacent to the conveyor assembly. The slab grinding section has suckers for keeping the glass slab next to a working plane spaced and/or offset with respect to the advancement plane, and a
(Continued)

computerized numeric control assembly to perform workings on the glass slab.

14 Claims, 3 Drawing Sheets

(51) Int. Cl.
*B28D 1/14* (2006.01)
*B23B 41/00* (2006.01)
*B24B 41/00* (2006.01)
*B24B 9/10* (2006.01)
*B24B 27/00* (2006.01)
*B28D 1/00* (2006.01)
*B28D 7/04* (2006.01)

(52) U.S. Cl.
CPC ........ *B24B 27/0069* (2013.01); *B24B 41/005* (2013.01); *B28D 1/003* (2013.01); *B28D 1/14* (2013.01); *B28D 7/04* (2013.01); *G05B 19/402* (2013.01); *G05B 2219/35525* (2013.01); *G05B 2219/36439* (2013.01); *G05B 2219/39106* (2013.01); *G05B 2219/45009* (2013.01); *G05B 2219/45161* (2013.01)

(58) Field of Classification Search
CPC ........... G05B 2219/39106; G05B 2219/45009; G05B 2219/45161
See application file for complete search history.

(56) References Cited

U.S. PATENT DOCUMENTS

| | | | | |
|---|---|---|---|---|
| 4,685,180 | A * | 8/1987 | Kitaya | G05B 19/182 29/33 R |
| 4,702,042 | A * | 10/1987 | Herrington | B24C 3/04 83/53 |
| 5,040,342 | A * | 8/1991 | McGuire | B24B 9/107 451/38 |
| 5,143,196 | A * | 9/1992 | Henn | B24B 41/068 198/465.2 |
| 5,807,166 | A * | 9/1998 | Bando | B24B 9/10 451/411 |
| 5,810,642 | A * | 9/1998 | Bando | C03B 33/03 451/5 |
| 5,857,603 | A * | 1/1999 | Lisec | C03B 33/023 225/2 |
| 6,461,223 | B1 * | 10/2002 | Bando | C03B 33/03 451/70 |
| 7,036,656 | B2 * | 5/2006 | Gariglio | B65G 15/58 198/689.1 |
| 7,134,936 | B2 * | 11/2006 | Gariglio | B24B 41/04 451/262 |
| 8,550,874 | B2 * | 10/2013 | Bando | B28D 1/24 451/14 |
| 2008/0092594 | A1 * | 4/2008 | Vianello | B24B 9/102 65/61 |

* cited by examiner

MACHINE FOR WORKING GLASS SLABS WITH A COMPUTERIZED NUMERIC CONTROL ASSEMBLY AND RELATED PRODUCTION PROCESS

BACKGROUND OF THE INVENTION

1) Field of the Invention

The present invention refers to a machine for working glass slabs with a computerized numeric control assembly, which is able to perform in a single machine all necessary workings for producing a finished glass slab, and to the related production process.

2) Background Art

Machines for working glass slabs are known in the art, which are able of performing only some of the workings of the production process, in particular cutting, grinding, drilling, washing or other similar workings, which are necessary for producing of a glass slab.

These machines for working glass slabs however are not satisfactory and have the problem that the working places need big spaced both due to overall sizes of the machines, and due to the occupation of passing areas of the slabs between a working and another.

SUMMARY OF THE INVENTION

Object of the present invention is solving the above prior art problems, by providing a single machine for working glass slabs which performs all workings which are currently performed in independent workplaces.

In this way, the inventive machine for working glass slabs reduces the space occupied by the production line, drastically reduces the production cycle times, and removes handling of non-ground glass by operators, which is a tiring and dangerous operation.

A further object of the present invention is providing a production process equipped with completely automated innovative steps, which can be performed through the machine for working glass slabs of the invention.

The above and other objects and advantages of the invention, as will appear from the following description, are obtained with a machine for working glass slabs and a process as described in the respective independent claims. Preferred embodiments and non-trivial variations of the present invention are the subject matter of the dependent claims.

It is intended that all enclosed claims are an integral part of the present description.

BRIEF DESCRIPTION OF THE DRAWINGS

The present invention will be better described by some preferred embodiments thereof, provided as a non-limiting example, with reference to the enclosed drawings, in which.

DETAILED DESCRIPTION OF PREFERRED EMBODIMENTS

Figure 1:
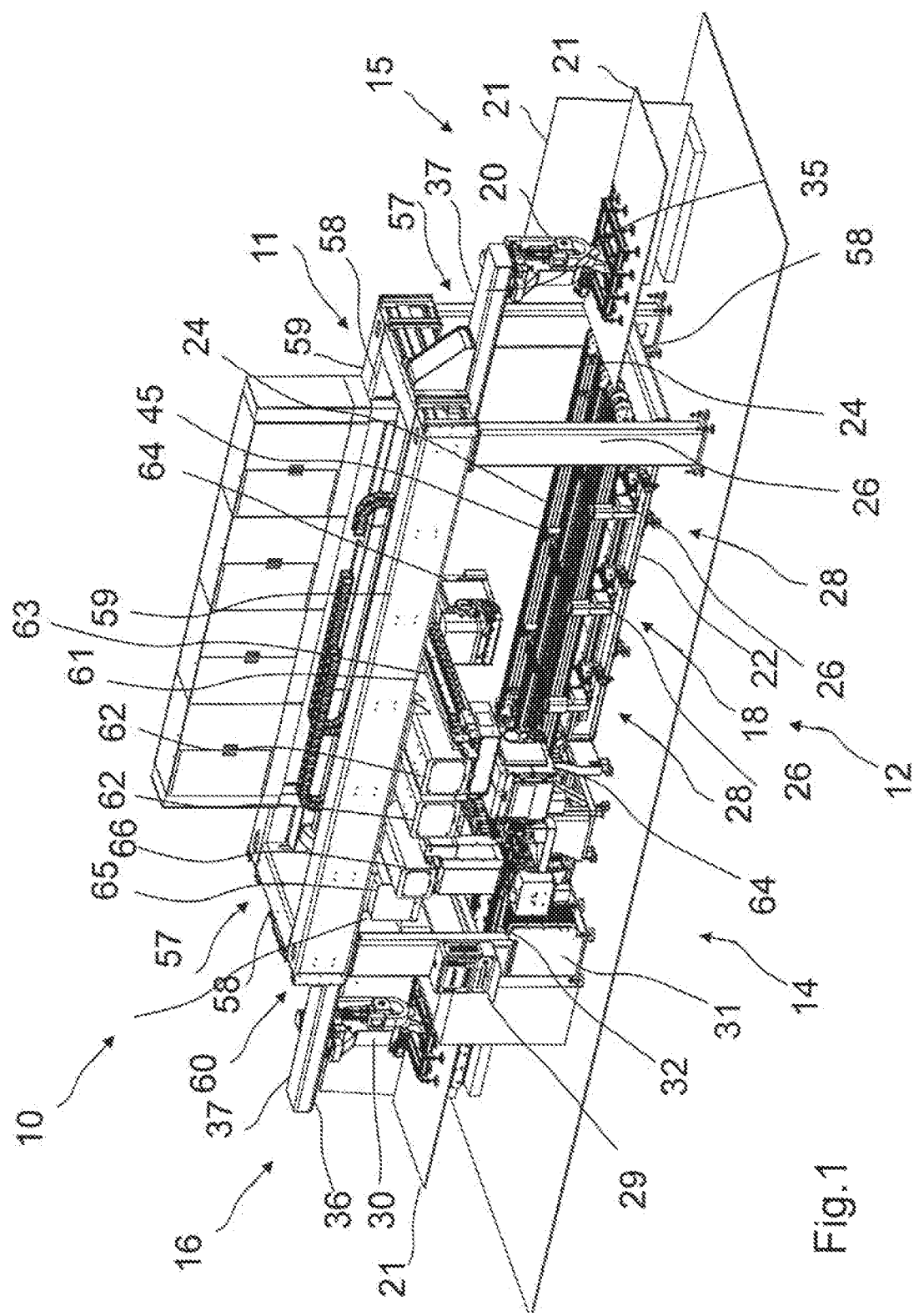
FIG. 1 is a perspective view of an embodiment of a machine for working glass slabs according to the present invention.
Figure 2:
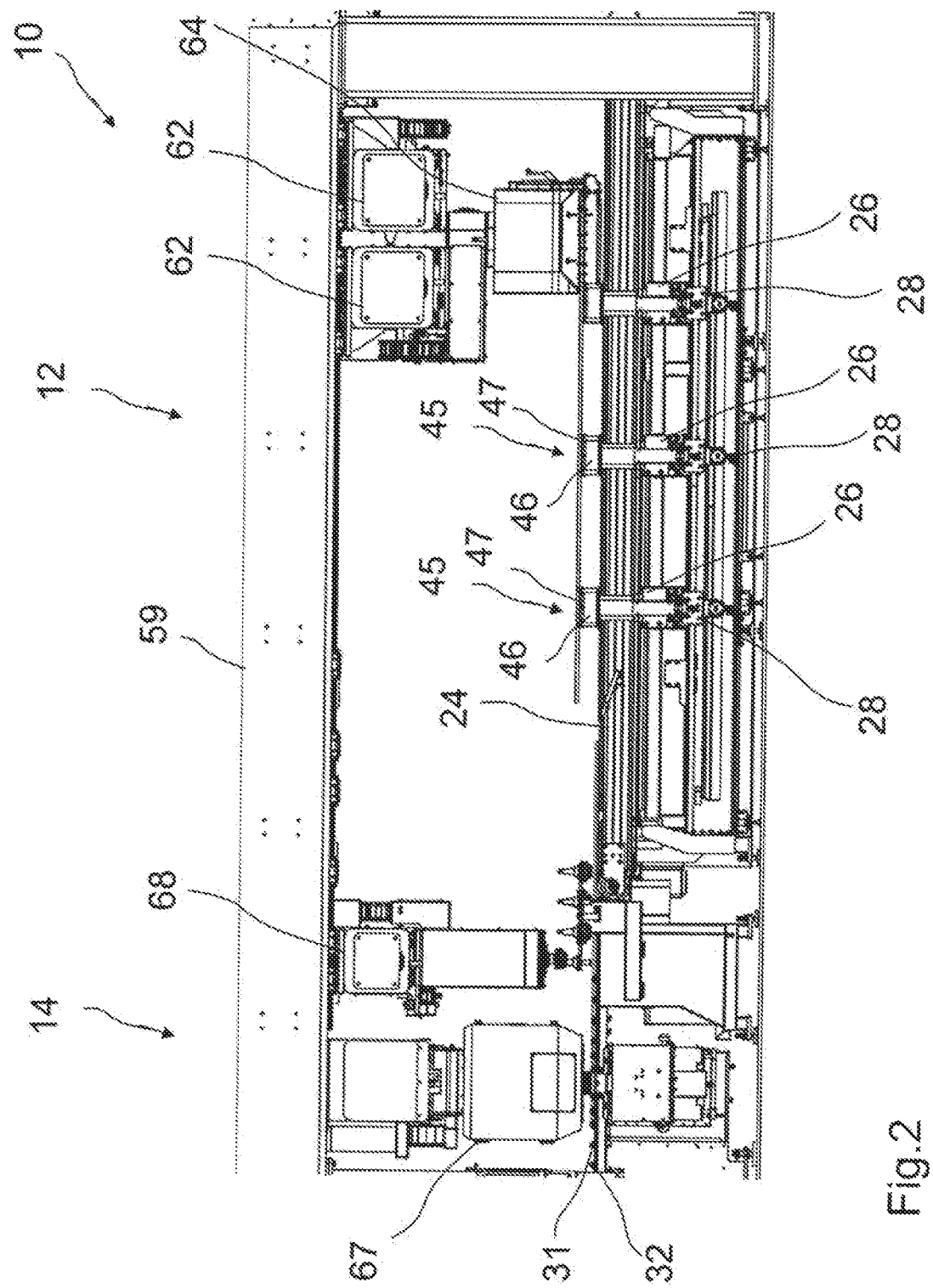
FIG. 2 is a side detailed view of the grinding section and of the drilling section of the machine for working glass slabs of FIG. 1.
Figure 3:
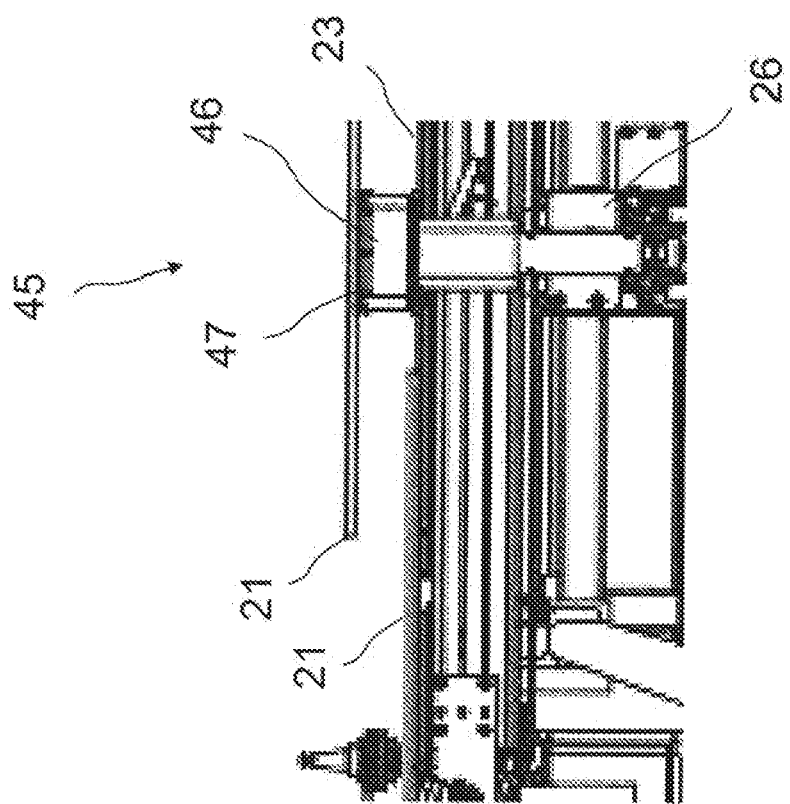
FIG. 3 is a view of an enlarged part of the view of FIG. 2.

With reference to the Figures, a preferred embodiment of the machine for working glass slabs of the present invention is shown and described. It will be immediately obvious that numerous variations and modifications (for example related to shape, sizes, arrangements and parts with equivalent functionality) can be made to what is described, without departing from the scope of the invention, as appears from the enclosed claims.

With reference to the Figures, the machine 10 for working glass slabs 21 of the invention comprises a supporting structure 11, a slab grinding section 12 and a slab drilling section 14; in the slab drilling section 14 drilling, milling and countersinking operations are performed on the glass slab 21.

The slab grinding section 12 comprises a conveyor assembly 18 on which the glass slabs 21 to be ground are deposited.

The conveyor assembly 18 comprises dragging means 24 adapted to move the glass slab 21 along a longitudinal X-X supply direction towards the slab grinding section 12; the conveyor assembly 18 is moreover adapted to move the glass slab 21 along direction X-X towards the slab drilling section 14 at the end of the grinding operation.

The conveyor assembly 18 is preferably composed of a supply bench 18, which comprises a basement 22 and the dragging means 24, composed for example of belts 24, which are adapted to move the glass slab 21 in the X-X direction on an advancement plane 23, preferably a horizontal plane, to perform the positioning of the glass slab 21 in the grinding area.

The slab grinding section 12 further comprises retaining means 45, for example of the type disclosed in EP-A1-1166961, controlled by the electronic command and control unit 29 to keep the glass slab 21 next to a working plane 25 spaced from the advancement plane 23, when grinding; the retaining means 45 are moreover adapted to keep the glass slab 21 next to the advancement plane 23.

Preferably, the retaining means 45 are connected to beams 26, which extend in a transverse direction, preferably perpendicular, to the X-X direction and which are assembled sliding along the X-X direction on guides 27; each beam is actuated by a handling assembly 28, preferably composed of a mechanical pinion-type transmission and precision rack, connected to an electric motor, for example of the brushless type with position control and controlled by the electronic command and control unit 29 adapted to control the movement of every beam 26 on the guides 27 and to coordinate the movements of the beams 26 when grinding, as will be explained below in more detail.

In particular, the retaining means 45 comprise a row of suckers 46, which have an upper surface 47 for abutting the slab 21 to be ground and are connected to a known depressor, for example through respective pneumatic control valves.

Each sucker 46 carries a lower stem coupled with a pneumatic cylinder integral with the respective beam 26 and which defines, with its related stem, an actuator, which is controlled by the control unit 29 in order to vertically move the suckers 46 between a lowered rest position, wherein the slab 21 is arranged on the dragging means 24 to be transferred onto the advancement plane 23 towards the grinding section 12, and a lifted position, wherein the slab 21 is arranged next to the working plane 25 in a spaced position from the dragging means 24 to be ground.

The supporting structure 11 is a frame structure, which is fixed with respect to the conveyor assembly and therefore with respect to its supply bench 18, preferably with respect to the basement 22, and comprises two front portals 57 which comprise cross members 58 arranged transversally, or perpendicularly, to the X-X direction.

The supporting structure 11 further comprises two railings 59, which extend between the front portals 57, are part of side portals 60 and comprise guides 61 parallel to the X-X direction.

The supporting structure 11 supports bridges 62, 65, 66 parallel to the cross members 58, which are connected in a sliding way to the railings 59 through the guides 61, and are actuated by respective motors, housed for example in the supporting structure 11 and driven by the unit 29 in order to translate the bridges 62, 65, 66 along the guides 61.

The bridges 62 of the slab grinding section 12 of the machine 10 for working glass slabs of the invention comprise respective guides 63, transverse or preferably perpendicular to the X-X direction, with which respective grinding heads 64 are coupled in a sliding way, each actuated by da respective motors, housed for example on a support connected to the grinding head 64 and driven by the unit 29 to move the grinding heads 64 in a coordinate way along respective paths defined by the guides, in order to grind the edges of the glass slab 21, as will be explained below in detail.

In particular, when grinding the electronic command and control unit 29 is adapted to control and coordinate the movement of the beams 26 on the guides 27 in order to move the beams 26 and the glass slab 21 held thereby along the X-X direction, but with opposite direction to the movement one of the grinding heads 64.

The slab drilling section 14 is placed downstream of the slab grinding section 12 and comprises a belt-type conveyor 31 of a known type, preferably a vacuum belt conveyor of the type disclosed in EP-A1-1533255.

The belt conveyor 31 is adjacent to the conveyor assembly 18 of the slab grinding section 12 in the X-X direction, is substantially placed at the same height of the advancement plane 23 of the conveyor assembly 18 and is adapted to receive the glass slab 21 from the conveyor assembly 18 at the end of the grinding operation and to firmly keep it, guaranteeing an unmovable holding of the slabs 21 during their transport and working.

Preferably, the slab drilling section 14 of the machine 10 for working glass slabs of the invention comprises two parallel belt-type conveyors 31, adapted to advance the glass slab 21 along the X-X direction to perform the positioning of the glass slab 21 in the drilling area by means of known positioning means.

The known belt conveyor 31 comprises at least one belt 32 equipped with at least one suction room comprising a through-hole and a vacuum chamber, and operates by using vacuum obtained through a general vacuum circuit, driven for example by a solenoid valve, which activates the vacuum itself; every vacuum chamber is equipped with a known valve to make or remove vacuum in/from the chamber.

In order to perform the best holding on the slabs 21, the belt 32 is equipped with a plurality of suction rooms with respective holes obtained for all its longitudinal extension; in this way, by applying vacuum to the conveyor itself, the suction rooms will compose a sort of suction chambers, which will progressively operate on the slab 21, which covers them when passing over them, and which will be disabled, by progressively remove vacuum therefrom In a known way, as soon as a slab 21 has passed them in its movement along the X-X direction.

The slab drilling section 14 further comprises a bridge 65 comprising guides 63, transverse or preferably perpendicular to the X-X direction, with which a multifunction rotary head 67 is coupled in a sliding way, such head 67 being equipped with a plurality of tools and driven by the electronic command and control unit 29; for example, a multifunction rotary head which can be used is disclosed in EP-A1-2631048, which describes a head equipped with a plurality of diamond-type tools and with at least one watertype cutting spindle to perform drilling and water-cutting workings of the glass slab 21.

Preferably, the machine 10 for working glass slabs 21 of the invention comprises a computerized numeric control assembly or CNC 68, with related tool storehouse, placed downstream of the slab grinding section 12 and connected in a sliding way on transverse or preferably perpendicular guides 63, along the X-X direction, to a bridge 66, preferably interposed between the bridge of the grinding section 62 and the bridge of the drilling section 65.

The bridge 66 of the computerized numeric control assembly 68 is adapted to slide on the guides 61 transverse to the X-X direction of the railings 59, to position the computerized numeric control assembly 68 in the grinding section 12 or in the drilling section 14, and perform workings on the glass slab 21 held by the retaining means 45; optionally, the computerized numeric control assembly 68 is adapted to perform workings on the glass slab 21 when it is held by the belt conveyor 31.

The computerized numeric control assembly 68 is adapted to perform workings on the glass slab 21 both when the retaining means 45 keep the slab 21 next to a working plane 25 spaced from the advancement plane 23, and when they keep them on the advancement plane 23; these workings can further be performed with an offset slab, namely with the slab 21 which projects in the drilling section 14, above the belt conveyor 31, but is held by the retaining means 45 of the grinding section 12.

The movement of the bridge 66 connected to the computerized numeric control assembly 68 and the movement of the beams 26 connected to the retaining means 45 which keep the glass slab 21 are controlled by the electronic command and control unit 29 to coordinate and synchronize them in order to perform workings with the computerized numeric control assembly 68 both when the beams 26 and the glass slab 21 are unmoving, and when they are moving, with the computerized numeric control assembly 68 which is adapted to operate as follower of the glass slab 21.

The glass slabs 21 are taken from a loading storehouse external to the machine 10 for working glass slabs and deposited onto the conveyor assembly 18 of the slab grinding section 12 through a slab loading system 15, and at the end of the working of the glass slab 21, are taken from the belt conveyor 31 and unloaded on a storehouse for finished products, also external to the machine 10, by means of a slab unloading system 16.

Preferably, the slab loading system 15 and the slab unloading system 16 are respectively composed of a manipulator 20, 30 with a known system of suckers with automatic selection, having four axes servo-controlled, for example, by a brushless motor, whose activation is managed by the electronic command and control unit 29 depending on size and shape of the glass slab 21 and adapted to take the slab 21 from the loading storehouse, to deposit the slab 21 onto the conveyor assembly 18 and then to take from the belt conveyor 31 the worked slab 21, and to insert it into the storehouse for finished products.

Preferably, the machine 10 for working glass slabs of the invention comprises the slab loading system 15 and the slab unloading system 16 respectively composed of the manipulator 20, and installed each on a respective sliding guide 35, 36 connected to the supporting structure 11 through a longitudinal beam 37, 38 and adapted to slide along the X-X direction.

The sliding guide 35 of the manipulator 20 of the slab loading system 15 is connected to the longitudinal beam 37 which is in turn connected to the front portal 57 of the supporting structure 11 upstream of the slab grinding section 12, while the sliding guide 36 of the manipulator 30 of the slab unloading system 16 is connected to the longitudinal beam 38 which is in turn connected to the front portal 57 of the supporting structure 11 downstream of the slab drilling section 14.

The movement of the manipulator 30 of the slab unloading system 16 on the sliding guide 36 is controlled by the electronic command and control unit 29 to coordinate and synchronize it with the movement of the glass slab 21 on the belt 32 of the belt conveyor 31, so that the manipulator 30 is adapted to take the glass slab 21 while it moves on the belt conveyor 31, going out of the slab drilling section 14 of the machine 10 for working glass slabs of the invention, moving with a concordant and synchronous movement to the one of the slab 21 and to support it till the end of the process performed in the drilling section 14.

Preferably, the machine 10 for working glass slabs of the invention comprises a known washing/drying machine placed downstream of the slab drilling section 14, and upstream of the slab unloading system 16 along the X-X direction, which is adapted to wash the glass slabs 21 at the end of the workings. Preferably, the glass slab 21 is taken to the washing/drying machine by the belt conveyor 31.

The machine 10 for working glass slabs of the invention further comprises a software for managing and coordinating the workings through the electronic command and control unit 29.

The machine 10 for working glass slabs of the invention further comprises known sensors to detect, for example, slab sizes, position and other known control parameters of the workings and of the position of the slab 21 during its working.

The operation of the machine 10 for working glass slabs according to the present invention will now be described, which occurs under the control of the electronic command and control unit 29.

In a first step, the slab loading system 15, preferably the manipulator 10, takes the glass slab 21 from the loading storehouse.

In a following step, the slab loading system 15, and preferably the manipulator 10, deposits the slab onto the conveyor assembly 18 of the slab grinding section 12, preferably onto the dragging means 24 which move the glass slab 21 along the X-X direction on the advancement plane 23 to perform the positioning of the glass slab 21 in the grinding area through known positioning means.

Simultaneously with such step, there is a step in which each beam 26 of the slab grinding section 12 is actuated by the handling assembly 28 to progressively move away the beams 26 one from the other depending on the sizes of the slab 21, keeping the beams 26 in positions computed depending on the working to be performed.

Afterwards, there is a step in which the retaining means 45 are activated, preferably the suckers 46 which are covered by the slab 21 to keep the slab itself, and in a fifth, following step the actuators are activated to vertically move the suckers 46 in the lifted position in which the slab 21 is arranged next to the working plane 25 in the lifted grinding position.

When the glass slab 21 is in the lifted position, the grinding step of the slab 21 starts, which can be performed according to two different steps:

a known step in which the glass slab 21 is unmoving and the grinding heads 64 are moving together with the bridges 62 of the grinding section along the respective guides 63 and 61 for grinding the edges of the slab 21;

an inventive step in which the slab 21, held by the retaining means 45 connected to the beams 26, moves on the guides 27 along the X-X direction with opposite direction to the movement direction of the grinding heads 64; in particular, when the glass slab 21 has bigger sizes than those of the grinding section 12 along the X-X direction, during its movement the glass slab 21 will overlap the belt conveyor 31 of the following drilling section 14, without interfering therewith due to the lifted position of the working plane 25 on which there is the slab 21.

A following drilling step is performed in the slab drilling section 14, which has the steps of:

positioning the glass slab 21 onto the belt conveyor 31 of the slab drilling section 14;

performing drilling operations of the slab 21 with the multifunction rotary head 67 sliding with the bridge 65 on the respective transverse guides 63 and parallel guides 61.

The drilling step is followed by a step in which the slab unloading system 16, and preferably the manipulator 30, by moving on the sliding guide 36 with a movement which is concordant and synchronous with the movement of the slab 21 and of the belt conveyor 31 which keeps it, takes the glass slab 21 going out of the slab drilling section 14 while it moves on the belt conveyor 31, supporting it till the end of the drilling process.

Optionally, before the drilling step, there is a step in which the glass slab 21 is worked by the computerized numeric control assembly or CNC 68.

In this case, the step of working the glass slab 21 through the computerized numeric control assembly 68 is performed with the retaining means 45 activated to keep the slab 21, and can be performed both with deactivated actuators and the glass slab 21 at the height of the advancement plane 23, and with activated actuators in order to vertically move the slab 21 to the lifted position next to the working plane 25.

The working of the glass slab 21 through the computerized numeric control assembly 68 can further be performed both with an unmoving slab 21 and with a moving slab 21 operating as to follow the glass slab 21.

Optionally, the drilling step is followed by a washing step, wherein the slab 21 held preferably by the belt conveyor 31, crosses the washing-drying machine and is washed at the end of the workings.

Advantageously, the machine 10 for working glass slabs and the process of the invention allow perform workings of glass slabs with a machine which has reduced overall sizes.

In particular, grinding of a glass slab can be performed with a slab grinding section which has a smaller length than the length of the glass slab 21 which must be worked, due to the chance of grinding the slab while it moves along the X-X direction with opposite direction to the movement direction of the grinding heads 64, by overlapping to the belt conveyor 31 of the following drilling section 14, without interfering therewith due to the lifted position of the working plane 25 on which there is the slab 21.

Advantageously, the machine 10 for working glass slabs and the process of the invention allow reducing the necessary space to perform the whole process of working the glass slab 21, due to the slabs loading and unloading system 15, 16 connected to the respective longitudinal beams 37, 38, which do without the need of having a support bench.

The invention claimed is:

1. A machine for working glass slabs comprising:
a supporting structure;
a slab-grinding section comprising grinding heads which move along a longitudinal direction when grinding, and a conveyor assembly having dragging means which move the glass slabs on an advancement plane along the longitudinal direction;
a slab-drilling section placed downstream of the slab-grinding section and comprising a conveyor adjacent to the conveyor assembly in the longitudinal direction, substantially placed at a same height of the advancement plane of the conveyor assembly for receiving the glass slabs from the conveyor assembly at an end of the grinding operation;
wherein the slab-grinding section further comprises retaining means which keep the glass slabs next to a working plane spaced and/or offset with respect to the advancement plane, when the grinding heads move along the longitudinal direction to grind the glass slabs;
and the retaining means coupled to the glass slabs moving in an opposite direction relative to the longitudinal direction when the grinding heads move along the longitudinal direction to grind the glass slabs.

2. The machine of claim 1, further comprising a computerized numeric control assembly placed downstream of the slab grinding section adapted to slide along the longitudinal direction to position the computerized numeric control assembly in the grinding section or in the drilling section, and adapted to perform workings on the glass slabs held by the retaining means next to the working plane spaced and/or offset with respect to the advancement plane both when the retaining means and the glass slabs are unmoving, and when they are moving, operating as follower of the glass slabs.

3. The machine of claim 1, wherein the retaining means are connected to beams which extend in a transverse direction to the longitudinal direction and which are assembled sliding on guides, and wherein each beam is actuated by a handling assembly adapted to move every beam on the guides in a coordinate way with the other beams when grinding, with the glass slabs held next to the working plane spaced from the advancement plane.

4. The machine of claim 1, wherein the handling assembly is composed of a mechanical pinion-type transmission and precision rack connected to an electric motor with position control and controlled by an electronic command and control unit adapted to control the movement of every beam on the guides.

5. The machine of claim 1, wherein the slab drilling section comprises a multifunction rotary head equipped with a plurality of tools to perform workings on the glass slabs.

6. The machine of claim 1, wherein the supporting structure is a frame-type supporting structure fixed with respect to the conveyor assembly which comprises two front portals comprising cross members arranged transverse to the longitudinal direction, and two railings which extend between the front portals and comprise guides parallel to the longitudinal direction.

7. The machine of claim 6, wherein the supporting structure supports bridges parallel to the cross members which are connected in a sliding way to the railings through the guides, and are actuated by respective motors to translate the bridges along the guides.

8. The machine of claim 7, wherein the computerized numeric control assembly is connected in a sliding way to guides of a bridge which are transverse to the longitudinal direction.

9. The machine of claim 7, wherein the bridges of the slab grinding section comprise respective guides transverse to the longitudinal direction with which the grinding heads are coupled in a sliding way.

10. The machine of claim 6, wherein the slab drilling section comprises a bridge kW-comprising guides transverse to the longitudinal direction, with which the multifunction rotary head is coupled in a sliding way.

11. The machine of claim 6, wherein the bridge is interposed between the bridge of the grinding section and the bridge of the drilling section.

12. The machine of claim 1, comprising a slab-loading system adapted to take the glass slabs to be worked from a loading storehouse external to the machine and to deposit the glass slabs on the conveyor assembly of the slab-grinding section, and comprises a slab-unloading system adapted to take the glass slabs from the conveyor at the end of the working of the glass slabs and to unload the glass slabs into a storehouse for finished products, also external to the machine, the slab-loading system and the slab-unloading system being installed each on a respective sliding guide connected to the supporting structure through a longitudinal beam and adapted to slide along the longitudinal direction.

13. A process for working glass slabs with the machine of claim 1, the process comprising the steps of:
depositing the glass slabs onto the conveyor assembly of the slab-grinding section to move the glass slabs along the longitudinal direction on the advancement plane to perform the positioning of the glass slabs in the grinding area;
activating and moving the retaining means to a lifted and/or offset position wherein the glass slabs are arranged next to a working plane of the grinding heads;
starting the grinding step of the glass slabs when the glass slabs are in the lifted and/or offset position, held by the retaining means and move along the longitudinal direction with opposite direction to the movement direction of the grinding heads.

14. A process for working glass slabs with the machine of claim 2, the process comprising the steps of:
depositing the glass slabs on the conveyor assembly of the slab-grinding section to move the glass slabs along the longitudinal direction on the advancement plane to perform the positioning of the glass slabs in the grinding area;
activating and moving the retaining means in a lifted and/or offset position wherein the glass slabs are arranged next to a working plane of the grinding heads;
starting the grinding step of the glass slabs when the glass slabs are in the lifted and/or offset position, held by the retaining means and move along the longitudinal direction with opposite direction to the movement direction of the grinding heads;

performing a working of the glass slabs with the computerized numeric control assembly when the retaining means and the glass slabs are unmoving, or when they are moving operating as to follow the glass slabs.

\* \* \* \* \*